United States Patent [19]
Taniguchi et al.

[11] Patent Number: 5,432,048
[45] Date of Patent: Jul. 11, 1995

[54] REWRITABLE PHOTOCHROMIC OPTICAL DISC

[75] Inventors: Hitoshi Taniguchi; Fumio Matsui, both of Saitama, Japan

[73] Assignee: Pioneer Electronic Corporation, Tokyo, Japan

[21] Appl. No.: 589,654

[22] Filed: Sep. 28, 1990

[30] Foreign Application Priority Data

Dec. 28, 1989 [JP] Japan .................. 1-344058

[51] Int. Cl.⁶ .................. G03C 1/72; G03C 5/00
[52] U.S. Cl. .................. 430/333; 430/338; 430/342; 430/343; 430/345; 430/495; 430/945
[58] Field of Search .............. 430/338, 342, 343, 945, 430/495, 270, 333, 345; 346/76 L

[56] References Cited

U.S. PATENT DOCUMENTS

| | | | |
|---|---|---|---|
| 4,315,983 | 2/1982 | Kawamura et al. | 430/70 |
| 4,837,063 | 6/1989 | Irie | 428/65 |
| 4,871,649 | 10/1989 | Imataka et al. | 430/945 |
| 4,885,228 | 12/1989 | Inagaki et al. | 430/270 |

FOREIGN PATENT DOCUMENTS 62-281876 12/1987 Japan .
64-87684 3/1989 Japan .

OTHER PUBLICATIONS

Irie, Masahiro, "Phthalocyanine Compound and Optical Recording Using It", Eur. Pat. App., 28 pp., 1989 (abstract).
Morinaka, Akira et al., "Photochromic films as optical recording materials and their preparation", Japan, Kokai Tokkyo Koho, 7 pp. 1989 (abstract).
Irie, M. "Thermally Irreversible Photochromic Material for Erasable Optical Data"; Polym. Inf. Technol., [Proc. Am. Chem. Soc. Symp.] Meeting Date 1988, 105–116, Edited by: Mittal, Kashimiri Lab. Plenum: New York, N.Y., 1989 (abstract).
Irie, Masahiro, "Advance in Photochromic Materials for Optical Storage Media"; Jpn. J. App. Phys.; Part 1, 28 (Supp. 28.3), 215–219, 1989 (abstract).
Irie, Masahiro, "Thermally Irreversible Photochromic Material for Erasable Optical Storage Data", Polym. Prepr. (Am. Chem. Soc. Div. Polym. Chem.), 29(2), 215–216, 1988 (abstract).
Irie, Masahiro, "Ethylene Derivative as Laser-Sensitive Photochromic Substance for Optical Recording Reaction", Jpn. Kokai Tokkyo Koho, 16 pp., 1988 (Abstract).

Primary Examiner—Charles L. Bowers, Jr.
Assistant Examiner—Thorl Chea
Attorney, Agent, or Firm—Foley & Lardner

[57] ABSTRACT

A rewritable photochromic optical disc which comprises a photochromic recording layer made of a diaryl ethene derivative capable of assuming first to third states, the first state with a first absorption band transforming into the second state with a second absorption band in response to light of a first wavelength, the second state transforming into the first state in response to light of a second wavelength in said second absorption band, the fist state transforming into the third state with a third absorption band in response to light of a third wavelength, and the third state transforming into the first state in response to light of a fourth wavelength in said third absorption band.

1 Claim, 3 Drawing Sheets

REWRITABLE PHOTOCHROMIC OPTICAL DISC

BACKGROUND OF THE INVENTION

1. Field of the Invention

The present invention relates to a rewritable photochromic optical disc having a photochromic recording layer.

2. Description of Background Information

The EDRAW (Erasable Direct Read After Writing) optical disc is known as one of the rewritable memories capable of recording, reading, and erasing. Among EDRAW optical discs there is a rewritable photochromic optical disc provided with a thin film of organic photochromic material. It is capable of achieving a higher recording density than the magneto-optical disc which is provided with a thin film of rare earth-transition metal alloy having a magneto-optical effect.

The organic photochromic materials are compounds, which react with light to repeatedly change from a chromatic state to an achromatic state or vice versa. As shown in light-absorption spectral distribution curves of FIG. 1 by way of example, the materials have the following characteristics. When light of a wavelength B is absorbed by the organic photochromic material, it changes from a stable state X to a quasi-stable state Y in which it is rendered chromatic. When it absorbs light of a wavelength A or heat under the quasi-stable state Y, it returns to the original material again and is rendered achromatic. By utilizing the above described phenomenon, i.e., photochromism, a rewritable optical disc is produced, to and from which information is recorded, reproduced, or erased by a laser beam. As such organic photochromic materials, there are for example, those materials such as thioindigo which make use of the isomerization reaction with light, spiropiranes which utilize the ring opening/closure reaction and a redox reaction or the like, and flugido, etc.

An erasable optical disk, which, for example, makes use of the isomerization reaction with light and heat which is reversible as in the organic photochromic materials, is produced by the following process. As shown in FIG. 2 a recording layer 2 including the organic photochromic material is formed as a thin film on a transparent substrate 1 and then an aluminum-made reflecting layer 3 is formed on the recording layer 2 in the form of a thin-film. On the main surface of the substrate 1, grooves used for tracking, prepits for controlling the writing and reading of data, and preaddresses 5 are formed in advance by the process of stamping or the like. A laser beam 6 is irradiated on the photochromic material through the substrate 1 of the disk.

Recording of information on the optical disk is performed by applying light and heat energy to the recording layer 2 by means of a writing laser beam formed as a spot through an optical system of the pickup including an objective lens 4, generating the isomerization reaction positively, thereby forming a train of spots which assume changes in the tone or refractive characteristics. The reading of information from the optical disk is performed by irradiating a reading laser beam having another wavelength so as to read out the train of the spots which have been recorded.

The EDRAW disk can thus be obtained which is capable of recording information at a relatively high density.

With the EDRAW disk, further increase in recording density requires that the laser beam spot and the recording track are made much smaller. However, what is to be achieved to this end is limited in both cases.

OBJECT AND SUMMARY OF THE INVENTION

It is an object of the present invention to provide a rewritable photochromic optical disc which is capable of recording multi-value logical information. The rewritable photochromic optical disc according to the present invention comprises a photochromic recording layer made of a diaryl ethene derivative capable of assuming first, second and third states, the first state with a first absorption band transforming into the second state with a second absorption band in response to light of a first wavelength, the second state transforming into the first state in response to light of a second wavelength in said second absorption band, the first state transforming into the third state with a third absorption band in response to light of a third wavelength, and the third state transforming into the first state in response to light of a fourth wavelength in said third absorption band. The rewritable photochromic optical disc constructed as mentioned above is capable of recording tri-state logical information.

DESCRIPTION OF THE PREFERRED EMBODIMENT

The embodiment of the present invention will be described with reference to the accompanying drawings.

Figure 1:
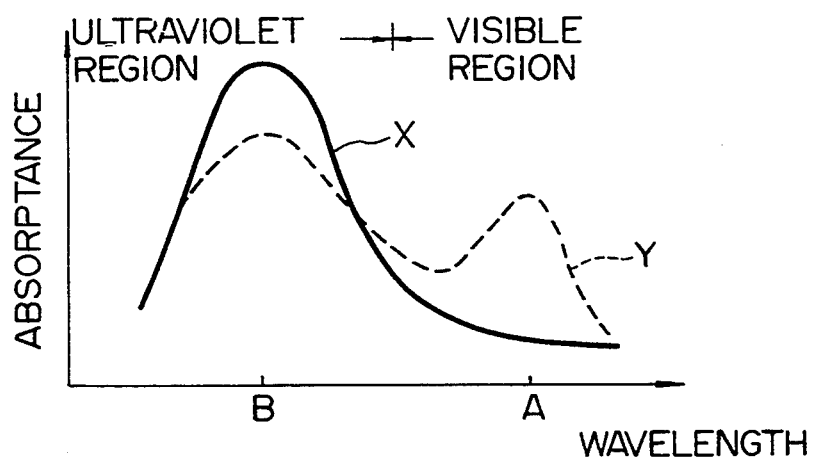
FIG. 1 is a graph showing the distribution of light absorptance spectrum of the organic photochromic material.
Figure 2:
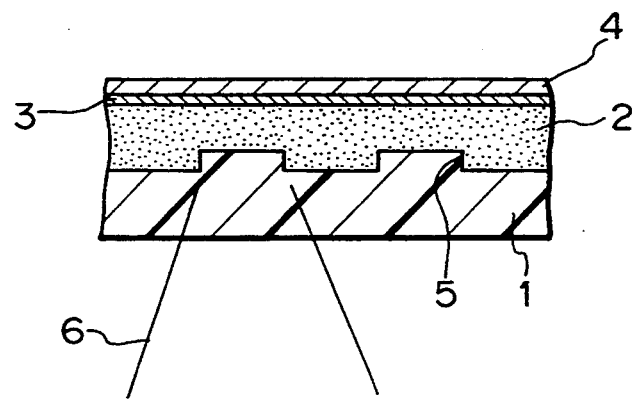
FIG. 2 is a partly enlarged sectional view of the rewritable photochromic optical disc.

The rewritable photochromic optical disc of the present invention is similar to the conventional one shown in FIG. 2, except the recording layer. It is made up of a substrate 1 and three layers (photochromic layer 2, reflective layer 3, and protective layer 4) consecutively formed thereon.

According to the present invention, the photochromic layer in the rewritable photochromic optical disc is made of a diaryl ethene derivative such as 1,2-di (2,3,5-trimethylthienyl)-1,2-dicyanoethene. This compound has the structure as represented by formula (A) below when it assumes the first state.

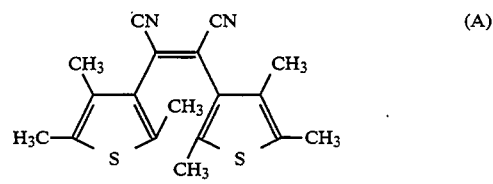

(A)

When this photochromic recording layer is irradiated with a ray of light having a wavelength of 420 nm (a first wavelength) and an adequate intensity, the derivative assumes the second state in which the carbon atom at position 5 in the thiophene ring becomes active and bonds to the carbon atom at position 5 in the adjacent thiophene ring, thereby forming a closed ring, as represented by formula (B) below.

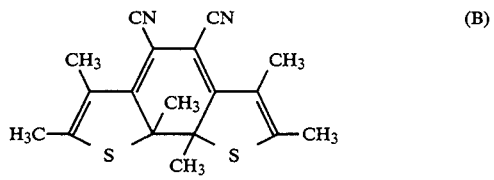

Figure 3:
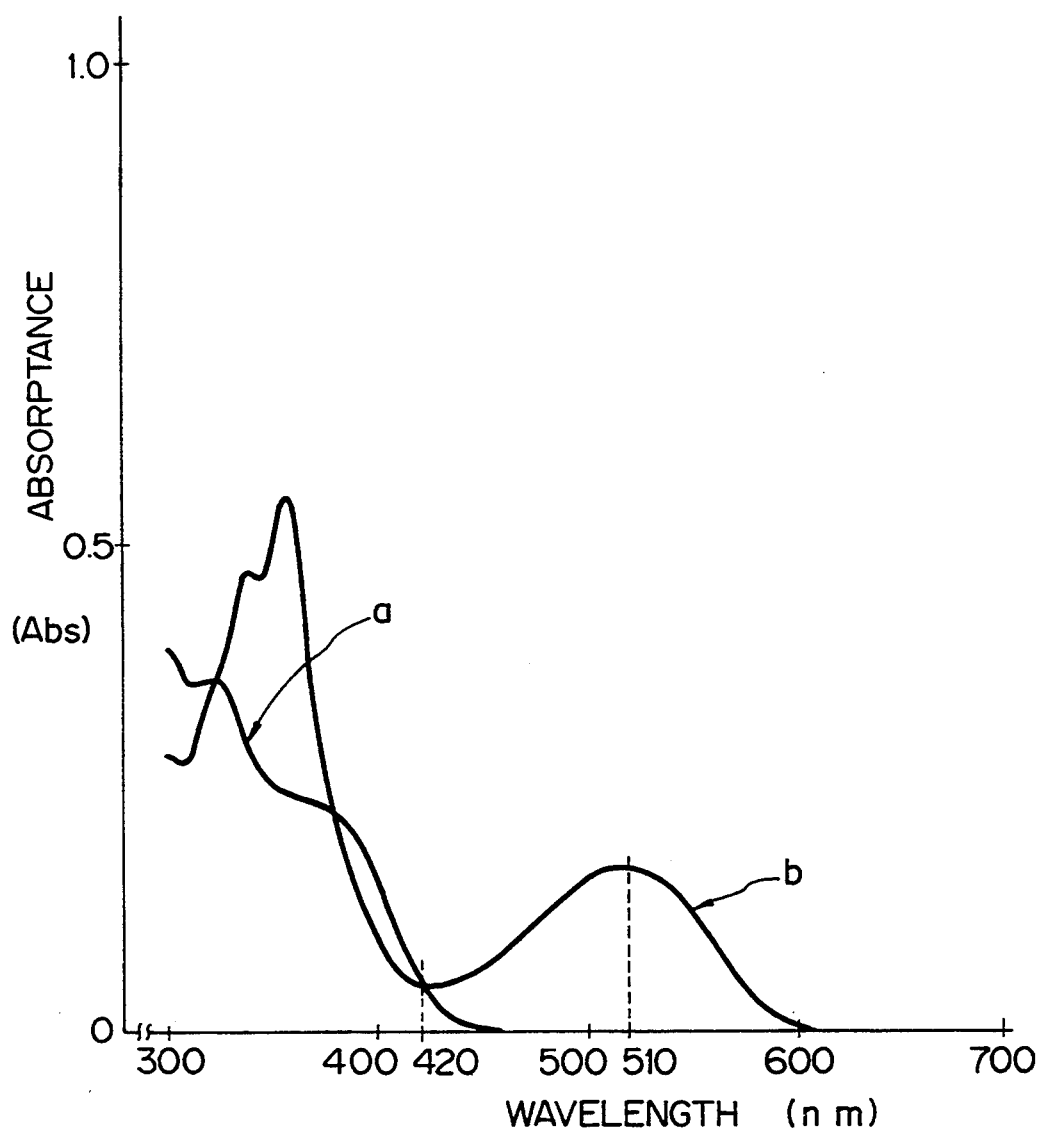
FIG. 3 is a graph showing the wavelength-absorptance characteristics of the photochromic recording layer in the first and second states.

The photochromic recording layer has the wavelength-absorptance characteristic curves in the first state and the second state indicated by "a" and "b", respectively, in FIG. 3. It is noted that the wavelength-absorptance characteristic curve (a) of the photochromic recording layer in the first state shows the first absorption band having a peak at a wavelength of about 300 nm. It is also noted that the wavelength-absorptance characteristic curve (b) of the photochromic recording layer in the second state shows the second absorption band having peaks at wavelengths of about 510 nm and 355 nm, (the height of the peak at a wavelength of about 300 nm becomes low). It is further noted that the wavelength-absorptance characteristic curve (a) of the photochromic recording layer in the first state does not have the peak at the wavelength of 510 nm.

When the photochromic recording layer in the second state is exposed to a ray of light having a wavelength of 520 nm (the second wavelength) in the second absorption band and an adequate intensity, the derivative assumes the first state again in which the bond connecting the two thiophene rings is broken and the thiophene rings are open.

When the photochromic recording layer in state one is exposed to a ray of light having a wavelength of 365 nm (a third wavelength) and an adequate intensity, the derivative assumes the third state which is different from the second state.

Figure 4:
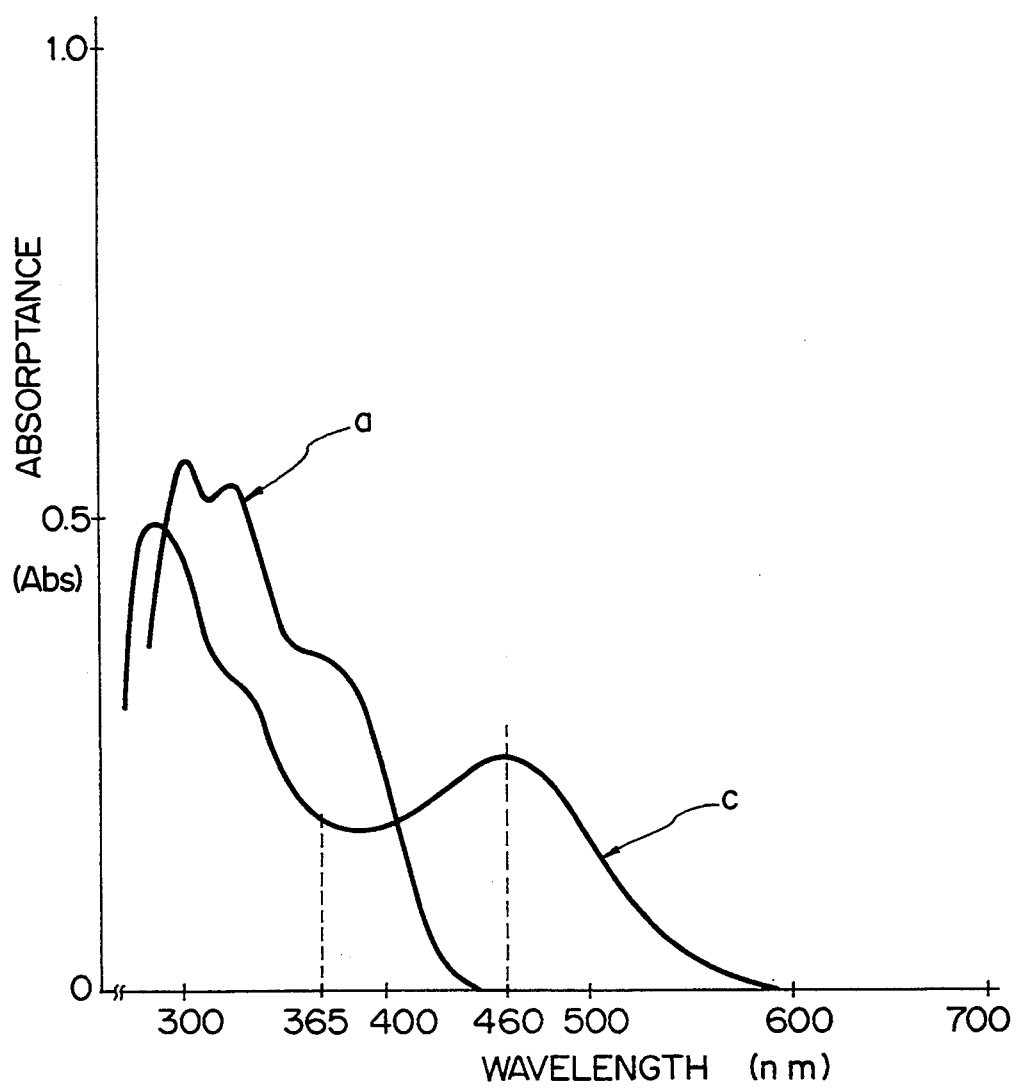
FIG. 4 is a graph showing the wavelength-absorptance characteristics of the photochromic recording layer in the first and third states.

The photochromic recording layer has the wavelength-absorptance characteristic curves in the first state and the third state indicated by "a" and "c", respectively, in FIG. 4. It is noted that the wavelength-absorptance characteristic curve (c) of the photochromic recording layer in the third state shows the peak at a wavelength of about 300 nm, whose height is lower than that when the photochromic recording layer is in the first state. It is also noted that the wavelength-absorptance characteristic curve (c) shows the third absorption band having a peak at a wavelength of about 460 nm. It is further noted that the wavelength-absorptance characteristic curve (a) of the photochromic recording layer in the fist state does not have the peak at the wavelength of 460 nm.

Finally, when the photochromic recording layer in state three is exposed to a ray of light having a wavelength of 460 nm (a fourth wavelength) in the third absorption band and an adequate intensity, the derivative returns to the first state.

The rewritable photochromic optical disc in the above-mentioned embodiment permits the recording of three logical values "0", "1", and "2" because the recording layer assumes three states. The first state may be regarded as an initial state representing the logical value "0". Then, the first state is transformed into the second state and the third state (for "writing"), each representing "1" and "2", by the irradiation of a laser beam having a first wavelength of 420 nm and a laser beam having a third wavelength of 365 nm, respectively. The second state and the third state can be returned to the first state (for "erasing") by the irradiation of a laser beam having a second wavelength of 520 nm and a laser beam having a fourth wavelength of 460 nm, respectively. The recording of tertiary logical states permits more than 25 times as many numerical representations as the conventional recording of binary logical states in the case of information represented by 8 bits per byte.

As mentioned above, the present inventors discovered that the reversible transformation from one state to another takes place in a diaryl ethene derivative such as 1,2-di(2,3,5-trimethylthienyl)-1,2-dicyanoethene which constitutes the photochromic recording layer. In other words, the reversible transformation between the first state (open ring state) and the second state (closed ring state) takes place by the irradiation of a ray of light having a first wavelength of 420 nm and and a ray of light having a second wavelength of 520 nm. Moreover, the reversible transformation between the first state and the second state takes place by the irradiation of a ray of light having a third wavelength of 365 nm and a ray of light having a fourth wavelength of 460 nm. The present invention is based on the discovery of this phenomenon.

The rewritable photochromic optical disc of the present invention permits the recording of ternary logical states on a single recording layer by using rays of light having four wavelengths, by utilizing the diaryl ethene derivative constituting the photochromic recording layer which assumes four states reversibly transformable from one to another in the following manner. The first state having the first absorption band transforms into the second state having the second absorption band by the irradiation of a ray of light having a first wavelength. The second state transforms into the first state by the irradiation of a ray of light having a second wavelength in the second absorption band. The first state transforms into the third state having the third absorption band by the irradiation of a ray of light having a third wavelength. The third state transforms into the first state by the irradiation of a ray of light having a fourth wavelength in the third absorption band.

What is claimed is:

1. A method recording three logical values on a photochromatic optical disc, comprising the steps of:
providing a rewritable photochromatic optical disc comprising a photochromatic recording layer of a diaryl ethene compound which exists in first, second and third states having different first, second and third wavelength-absorbance curves respectively, wherein the first state of the diaryl ethene compound is 1,2-di(2,3,5-trimethylthienyl)-1,2-dicyanoethene represented by the following formula (A)

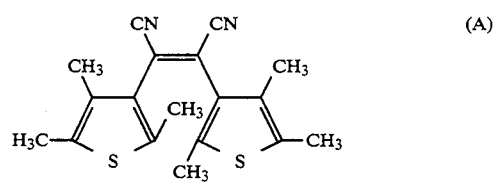

and wherein the first wavelength is 420 nm, the second wavelength is 520 nm, the third wavelength is 365 nm and the fourth wavelength is 460 nm, irradiating light of a first wavelength onto the recording layer in the first state to change the first state of the diaryl ethene compound into the second state when writing a first data;

irradiating light of a second wavelength onto the recording layer in the second state to change the second state of the diaryl ethene compound into the first state when erasing data;

irradiating light of a third wavelength onto the recording layer in the first state to change the first state of the diaryl ethene compound into the third state when writing second data; and irradiating light of a fourth wavelength onto the recording layer in the third state to change the third state of the diaryl ethene compound into the first state when erasing the second data.

\* \* \* \* \*